(12) United States Patent
Nowak et al.

(10) Patent No.: US 7,178,640 B2
(45) Date of Patent: Feb. 20, 2007

(54) BRAKE ACTUATOR

(75) Inventors: Stan Nowak, Balcatta WA (AU); Dorota H. Kieronska, Balcatta WA (AU); Vin C. Morley, Balcatta WA (AU)

(73) Assignee: Safe Effect Pty Ltd., Balcatta (AU)

( * ) Notice: Subject to any disclaimer, the term of this patent is extended or adjusted under 35 U.S.C. 154(b) by 0 days.

(21) Appl. No.: 10/487,864

(22) PCT Filed: Aug. 30, 2002

(86) PCT No.: PCT/AU02/01192

§ 371 (c)(1),
(2), (4) Date: May 26, 2004

(87) PCT Pub. No.: WO03/019034

PCT Pub. Date: Mar. 6, 2003

(65) Prior Publication Data

US 2004/0231931 A1   Nov. 25, 2004

(30) Foreign Application Priority Data

Aug. 31, 2001   (AU) .................................. PR7393

(51) Int. Cl.
*F16D 55/04* (2006.01)

(52) U.S. Cl. .................. 188/71.4; 188/71.5; 188/72.5; 188/73.2

(58) Field of Classification Search ............... 188/71.5, 188/72.4, 72.5, 73.2, 71.3, 71.4
See application file for complete search history.

(56) References Cited

U.S. PATENT DOCUMENTS

| 2,679,303 | A | * | 5/1954 | Wright et al. ............... 188/368 |
| 3,448,831 | A | * | 6/1969 | Newstead .................. 188/71.3 |
| 3,760,908 | A | * | 9/1973 | Rath et al. ................. 188/72.5 |
| 4,024,931 | A | * | 5/1977 | Klaue ....................... 188/18 A |
| 4,064,974 | A | * | 12/1977 | Filderman .................. 188/71.3 |
| 4,169,523 | A | * | 10/1979 | Malinowski et al. ...... 188/71.4 |
| 4,175,651 | A | * | 11/1979 | Montalvo, Sr. ......... 192/85 AB |
| 4,207,968 | A | * | 6/1980 | Chamberlain .............. 188/71.4 |

(Continued)

FOREIGN PATENT DOCUMENTS

DE    3605788 A1    8/1987

(Continued)

*Primary Examiner*—Devon Kramer
(74) *Attorney, Agent, or Firm*—Novak, Druce, DeLuca & Quigg LLP (57) ABSTRACT

A brake actuator includes an annular housing (10b) having first and second opposite radial faces (A and B). Cavities are formed in the housing (10b), some opening onto face (A) and some onto radial face (B). Two pistons (16) are disposed in each of the cavities and are movable under the influence of fluid pressure exerted from within the respective cavities to a braking position where the pistons (16) extend axially away from the cavity. The piston (16) bear against a backing plate of respective brake pads (68) forcing the brake pads (68) against brake discs (54 and 56). By providing cavities on both faces (A and B) of the housing (10b), an actuator can simultaneously apply brake pads to two spaced apart rotating discs (54 and 56). A plurality of actuators can be coupled together to act on a plurality of axially spaced apart brake discs to form a multi-pad multi-brake system.

36 Claims, 4 Drawing Sheets

U.S. PATENT DOCUMENTS

| | | | |
|---|---|---|---|
| 4,234,061 A * | 11/1980 | Margetts et al. | 188/71.3 |
| 4,505,393 A * | 3/1985 | Fleigle et al. | 211/41.1 |
| 4,754,856 A * | 7/1988 | Villata | 188/72.5 |
| 5,971,111 A * | 10/1999 | Maxwell et al. | 188/72.5 |
| 6,044,935 A * | 4/2000 | Mery et al. | 188/71.5 |
| 6,250,437 B1 * | 6/2001 | Wang | 188/72.5 |
| 2002/0166736 A1 * | 11/2002 | Yunba | 188/72.5 |

FOREIGN PATENT DOCUMENTS

| | | |
|---|---|---|
| GB | 920792 A | 3/1963 |
| GB | 2 074 265 A | 10/1981 |

* cited by examiner

BRAKE ACTUATOR

FIELD OF THE INVENTION

The present invention relates to a brake actuator and, in particular, a multi-piston actuator for use in forcing a plurality of brake pads against a rotating body.

BACKGROUND OF THE INVENTION

In order to increase braking power it is known to increase the surface area of friction material (eg brake pads or brake shoes) for pressing against a rotating body. For example, on heavy vehicles present practice is to use brake drums with brake shoes. Brake drums are known to have certain advantages over disc brakes. Major advantage of drum brake over disc brake is the superior braking force in some situations such as the continued application of braking force where temperature variations occur while the brake is on. However drum brake assemblies are complex in construction and assembly and generally comprise a large number of components and parts. As a result of the large number of components the brake assembly is expensive and time consuming to both assemble and to mount the brake system on the vehicle.

A further problem with drum brakes is that the drum shoe brake linings often do not become properly bedded in by wearing against the inner surface of the drum. To achieve good results a near perfect match is required between the diameters of the friction lining and the brake drum when the brake is applied. If the brake shoe lining is not in a proper contact with the brake drum over its entire surface it will result in an inferior or diminished braking force.

In relation to vehicles with disc brakes in order to improve braking power, it is possible to mount for example two sets of callipers about a rotating disc. An alternate method is to employ multiple discs which rotate with but are able to slide axially along a rotating body such as an axle and which are interleaved with fixed discs of friction material. In these multi-disc systems, an actuator such as a piston applies an axial force on the discs, causing them to press against the friction material and thus provide a braking effect.

While both the above methods for increasing braking power achieve their desired effect, they are not without disadvantage. For example, the area taken up by a brake calliper is relatively large compared to the area of brake pad that the calliper can apply to a disc. Therefore there is an inherent inefficiency in terms of the number of callipers that can be applied about a disc compared to the actual area of brake pad/disc contact. Further, there are inherent space limitations in conventional vehicles which prohibit the mounting of multiple callipers about a disc. With reference to the abovementioned multi-disc systems, these are relatively complex systems and also take up a substantial space which is often not available in production vehicles.

SUMMARY OF THE INVENTION

It is an object of the present invention to provide an alternate of brake actuator which is able to apply friction material at multiple discreet locations on a rotating body.

According to a first aspect of the present invention there is provided a brake actuator including at least:

an annular housing having first and second opposite radial faces;

a plurality of cavities formed in and about said housing, each of said cavities opening onto one of said first or second radial faces; and one or more pistons disposed in each of said cavities, each of said pistons moveable under influence of fluid pressure within a respective cavity to a braking position where said piston extends axially away from said respective cavity.

Preferably said housing is provided with a plurality of internal galleries providing fluid communication between a supply of actuating fluid and one or more of said cavities.

Preferably said galleries are arranged in one or more sets, each set providing fluid communication to at least one piston in two or more separate cavities.

Preferably said cavities pre evenly spaced about said housing.

Preferably at least one cavity opens on to said first radial face and at least one further cavity opens onto said second radial face.

Preferably circumferentially adjacent cavities open onto opposite ones of said first and second faces.

In an alternate embodiment, at least two of said cavities are relatively located to at least partially overlie each other and open onto respective opposite ones of said first and second radial faces.

In one embodiment the cavities that open onto said first face are radially offset from the cavities that open onto said second face.

Preferably said brake actuator includes a plurality of piston inserts, each insert demountably retained within a respective cavity, wherein each insert defines at least one cylinder for housing a corresponding piston.

In one embodiment, when each insert defines more than one cylinder, said insert is further provided with a passageway providing fluid communication between said cylinders.

However, in an alternate embodiment, when said insert defines more than one cylinder, said cylinders are fluidly isolated from each other.

Preferably, said housing is further provided with a recess in axial alignment with each of said cavities for receiving a brake pad.

According to a further aspect of the present invention there is provided a multi pad brake system including at least:

a rotor having a first radially extending brake disc, said brake disc having a first radial braking surface and a second opposite radial braking surface;

first and second brake actuators, each actuator in accordance with the first aspect of the present invention; and, a plurality of brake pads, said brake pads associated with the pistons of said first and second brake actuators; said first brake actuator juxtaposed relative to said first brake disc so that the brake pads associated with the pistons of the first brake actuator face said first braking surface; said second brake actuator juxtaposed relative to said first brake disc so that the brake pads associated with to the pistons of the second brake actuator face said second braking surface;

whereby, under influence of fluid pressure in the cavities containing the pistons with which said brake pads are associated, said brake pads are forced into contact with said first and second braking surfaces.

Preferably said first and second brake actuators are in fluid communication with each other.

Preferably said rotor includes a second radially extending brake disc having respective opposite first and second radial braking surfaces, said first and second brake discs axially spaced apart with said second brake actuator disposed therebetween; and wherein said second brake actuator includes at least one piston on the first radial face of the housing of the second brake actuator which faces the first braking surface of the second brake disc and, at least one piston on the second radial face of the housing of the second brake actuator which faces the second braking surface of the first disc whereby, upon influence of fluid pressure within the cavities of said second brake actuator, the brake pads associated with the pistons of the second brake actuator are pressed into contact with said second braking surface of said first disc and said first braking surface of said second disc.

Preferably the pistons on the first radial face of the housing of the second brake actuator are radially offset from the pistons on the second radial face of the housing of the second brake actuator.

Preferably said system includes: a third brake actuator, said third brake actuator in accordance with a first aspect of the present invention; and brake pads associated with the pistons of the third brake actuator; said third brake actuator juxtaposed relative to said second brake disc so that the brake pads coupled to the pistons of the third brake actuator face said second braking surface of said second disc.

Preferably said third brake actuator is in fluid communication with said first and second brake actuators.

According to the invention there is also provided a method of constructing a multi pad multi disc brake system including the steps of:

providing a plurality of brake actuators according to any one of claims 1 to 12;

providing a rotor having a plurality of brake discs, mutually adjacent brake discs being axially aligned with each other and axially spaced a fixed distance apart, each brake disc having opposite first and second radial braking surfaces;

disposing said brake actuators about said rotor so that pistons of said brake actuators face one of the braking surfaces of each brake disc;

associating a brake pad with the pistons in each cavity of said brake actuators;

relatively juxtaposing said brake actuators and brake discs so that under the influence of fluid pressure applied to said cavities said pistons can force said associated brake pads into contact with said one of said braking surfaces.

Preferably said method includes providing fluid communication between at least two of said actuators whereby fluid pressure exerted on actuating fluid in one of said actuators can be communicated via that one actuator to a second actuator.

DETAILED DESCRIPTION OF PREFERRED EMBODIMENTS

Figure 1:
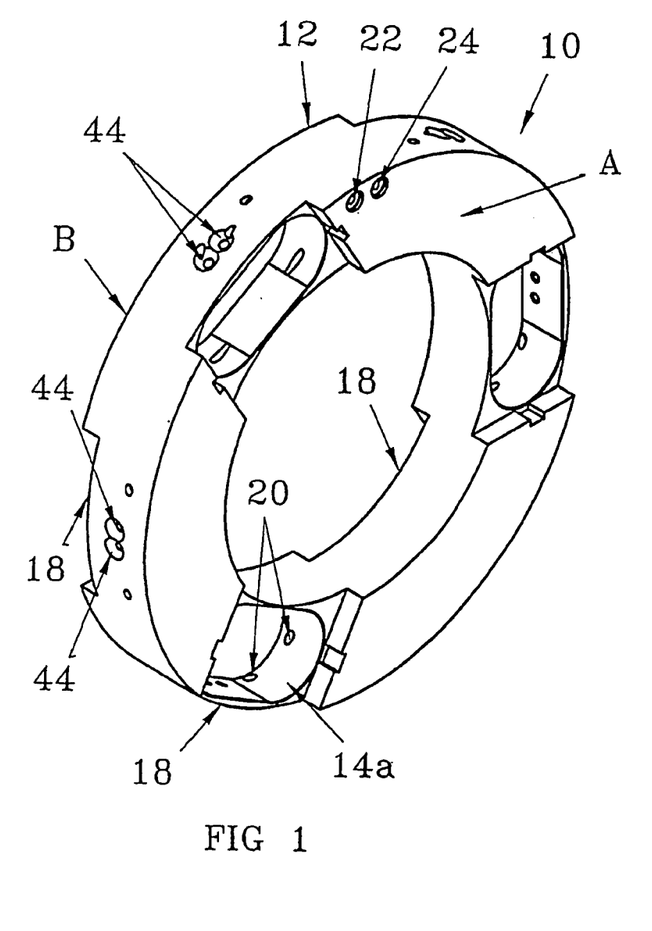
FIG. 1 is a perspective view from the front of a partially assembled brake actuator according to a first embodiment of the invention.
Figure 2:
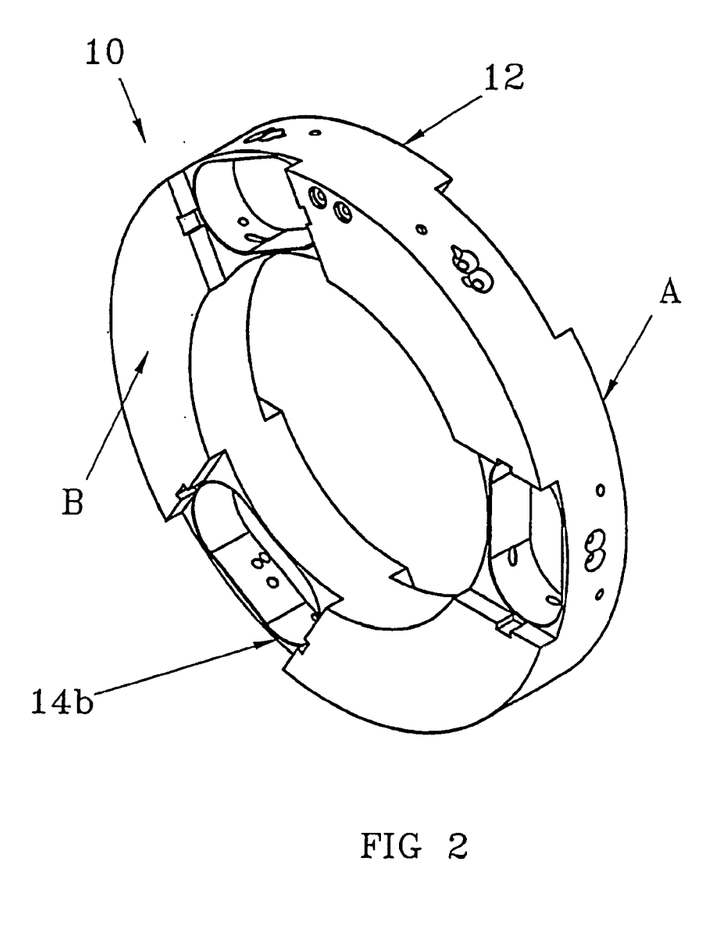
FIG. 2 is a perspective view from the back of a housing incorporated in the actuator depicted in FIG. 1.
Figure 3:
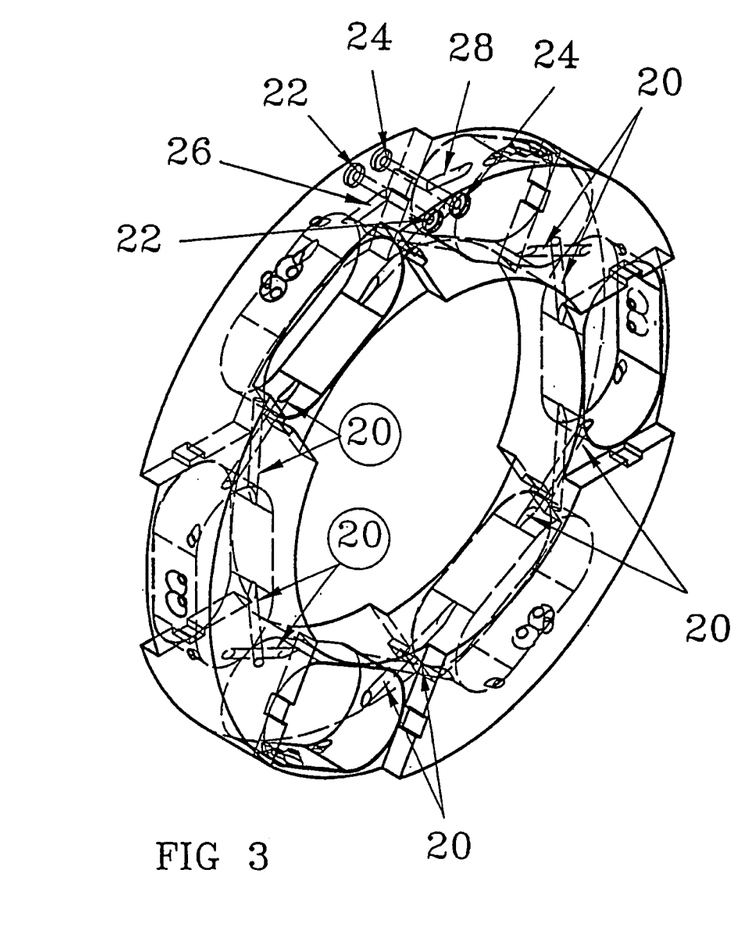
FIG. 3 is a perspective view of the housing from the front depicting internal detail.

Referring to FIGS. 1–3 of the accompanying drawings, a brake actuator 10 in accordance with an embodiment of the present invention includes an annular housing 12 having first and second opposite radial faces A and B.

Three cavities 14A are formed in the housing 12 opening on to face A, and three cavities 14B formed in the housing 12 opening on to face B. The cavities 14A and 14B (hereinafter referred to in general as "cavities 14") are of the same shape and configuration and are evenly spaced about respective faces A and B. Further, in this particular embodiment, the cavities 14 are circumferentially staggered about the housing 10 so that the cavities 14A and 14B do not overlie each other. The cavities 14 are blind cavities in that they do not fully extend through the axial thickness of the housing 10.

Two pistons 16 are disposed in each of the cavities 14. (For the sake of clarity, the pistons 16 are depicted only in the cavity 14A at the "10 o'clock" position in FIG. 1.) The pistons 16 are moveable under the influence of fluid pressure exerted from within respective cavity 14 to a braking position where the pistons 16 extend axially away from the cavity 14.

Figure 4:
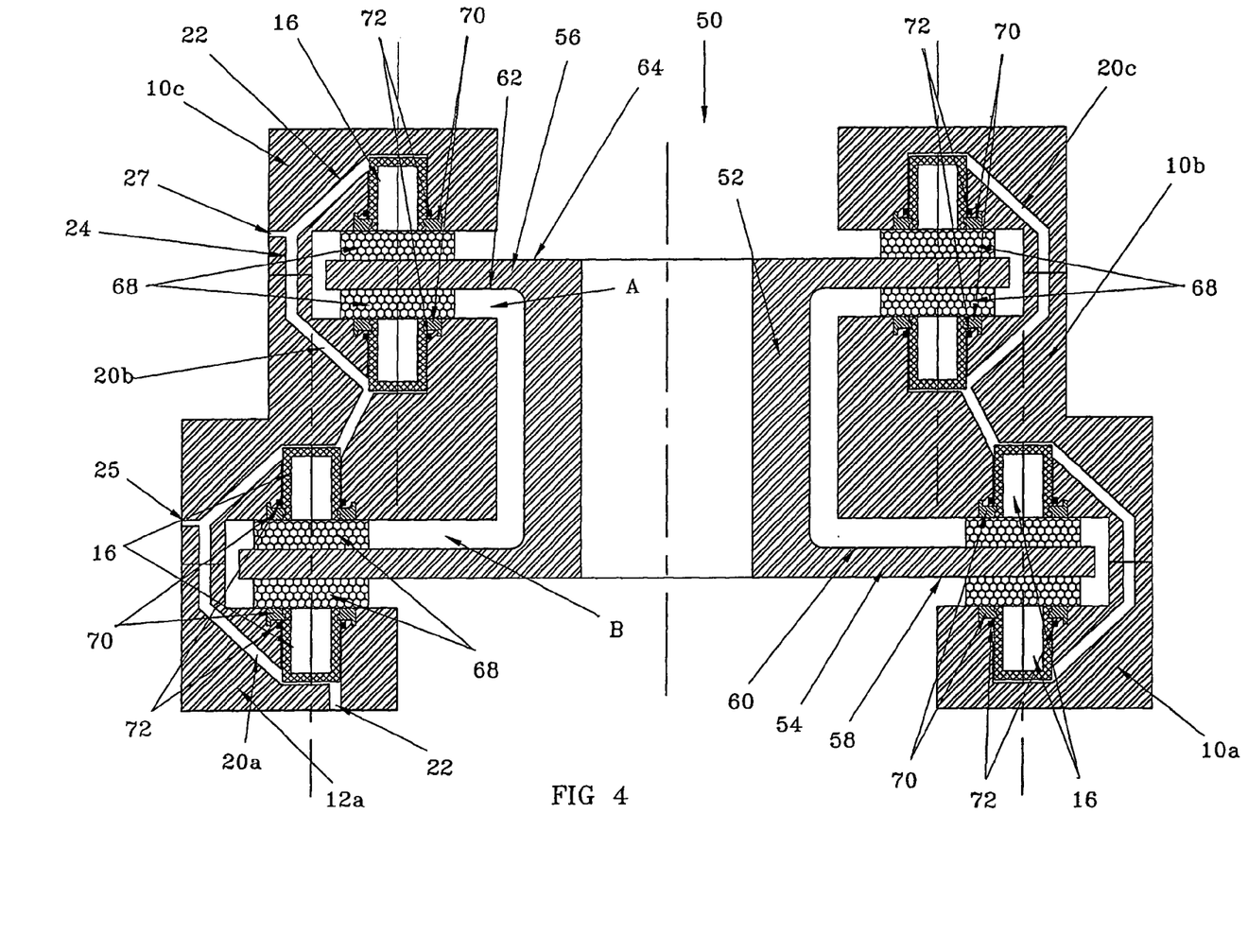
FIG. 4 is section view of a braking system incorporating a plurality of actuators.
Figures 5, 6:
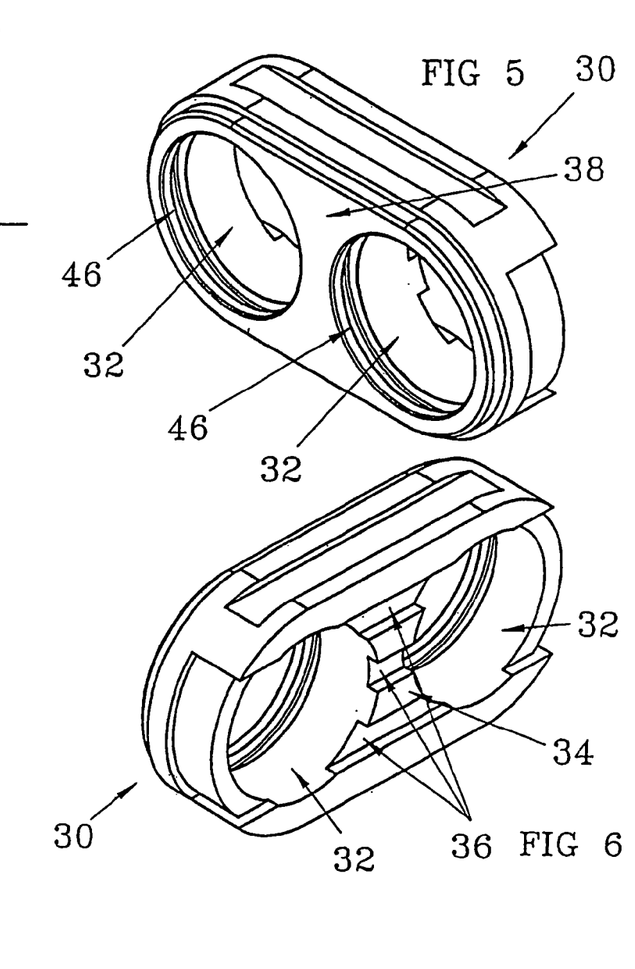
FIG. 5 is a front perspective view of an insert incorporated in the actuator.
FIG. 6 is a perspective view from the rear of the insert depicted in FIG. 5.
Figure 7:
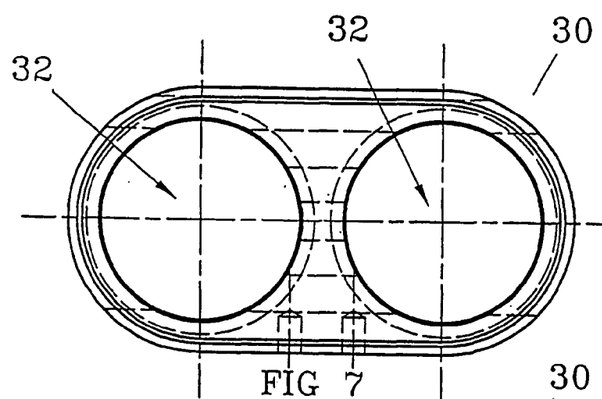
FIG. 7 is a plan view of the insert depicted in FIGS. 5 and 6.
Figure 8:
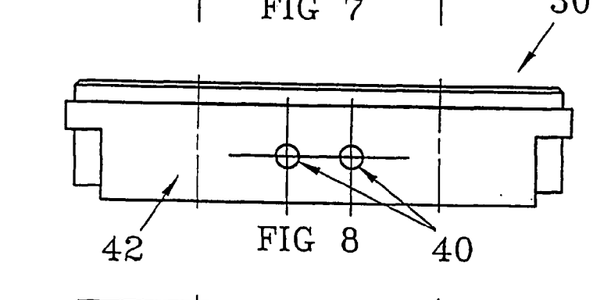
FIG. 8 is a bottom plan view of the insert depicted in FIG. 7.
Figure 9:
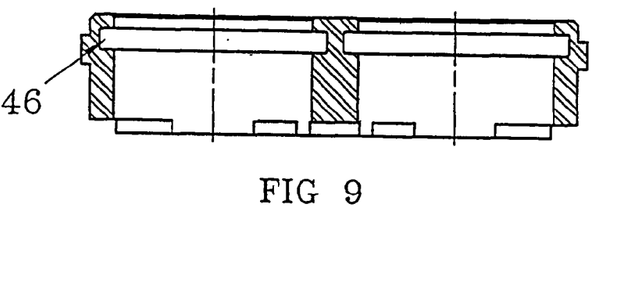
FIG. 9 is a view through Section B—B of the insert depicted in FIG. 7.

With reference to FIG. 4 the pistons 16 bear against a backing plate of a brake pad 68 for forcing the brake pad against a rotating disc such as brake discs 54 and 56 of a motor vehicle.

In order to accommodate the brake pads 68 the housing 10 is also provided with a plurality of recesses 18, one of each overlying a respective cavity 14.

By providing cavities 14 on opposite faces A and B of the housing 10, it will be appreciated that the actuator 10 can operate simultaneously on two spaced apart parallel rotating discs.

Referring to FIG. 3, it can be seen that the actuator 10 also includes a plurality of internal galleries 20 providing fluid communication between a supply of actuating fluid (e.g. brake fluid, not shown) and one or more of the cavities 14. In this embodiment, a relatively simple arrangement of galleries 20 is provided in which mutually circumferentially adjacent ends of adjacent cavities 14 are linked by two separate crossed internal galleries 20. The crossing of adjacent galleries 20 can occur by the galleries 20 extending diagonally relative to each other but in respective parallel planes. It is however possible to form the galleries 20 so as to also cross over in respective inclined planes.

A fluid inlet port 22 and fluid outlet port 24 are formed axially in the housing 10 adjacent to each other. Internal gallery 26 provides fluid communication between the inlet port 22 and an adjacent cavity 14A while internal gallery 28 provides fluid communication between the outlet port 24 and the adjacent cavity 14B.

FIGS. 5–9 depict a piston insert 30 for insertion into each of the cavities 14 to define respective cylinders 32 for housing corresponding pistons 16. The insert 30 is provided with a rear face 34 in which is formed a plurality of channels 36 extending between the adjacent cylinders 32. The channels 36 provide fluid communication between the adjacent cylinders 32. Accordingly, by this arrangement, the pistons 16 within a particular cavity 14 are subjected to substantially the same fluid pressure.

The thickness of the insert 30 is arranged to be substantially the same as the depth of the cavities 14 so that when the insert 30 is placed within the cavity 14, front face 38 of the insert 30 lies substantially flush with the opening of the cavity 14. A pair of holes 40 is formed on a peripheral wall 42 of the insert 30 which is located on a radially outer side of the insert 30 when disposed within the cavity 14. The holes 40 register with corresponding holes 44 formed radially in the housing 10. Fasteners such as grub screws (not shown) threadingly engage the holes 40 and 44 to secure the inserts 30 within their respective cavities 14.

A circumferential groove 46 is formed about an inner circumferential surface of each cylinder 32 near the front face 38 for seating a seal (not shown).

FIG. 4 illustrates a multi pad brake system 50 which includes a rotor 52 and three brake actuators 10a, 10b and 10c. The actuators 10a, 10b and 10c are in a general form similar to the actuator 10 depicted in FIGS. 1–3. The rotor 52 includes first and second radially extending brake discs 54 and 56. The disc 54 has first and second opposite radial braking surfaces 58 and 60 respectively. Likewise, the brake disc 56 has opposite first and second radial braking surfaces 62 and 64 respectively. The brake disc 54 is formed integrally with the rotor 52 while the disc 54 is in the form of a separate annular disc which is attached by way of bolts (not shown) to the rotor 52.

Each of the actuators 10a, 10b and 10c is provided with a plurality of cavities 14 which house pistons 16 in a similar manner as described in relation to the actuator 10 illustrated in FIGS. 1–3. However, in the system 50 depicted in FIG. 4, the actuators 10a and 10c are provided with cavities 14 which open on to respective faces A only of the housings 12a and 12c of the corresponding actuators 10a and 10c. On the other hand, the actuator 10b is provided with cavities 14 that open on to both opposite faces A and B of the corresponding housing 12b. Further the cavities 14 and thus the pistons 16 on face A of actuator 10b are radially offset relative to those on face B. Associated with, or otherwise coupled to, the pistons 16 are brake pads 68.

The first actuator 10a is juxtaposed relative to the first brake disc 54 so that the brake pads 68 coupled to the pistons 16 of the actuator 10a face the first braking surface 58.

The second brake actuator 10b is disposed between the brake discs 54 and 56 and is juxtaposed so that the brake pads 68 coupled to the pistons 16 on face B of the actuator 10b face the braking surface 60 of the disc 54 while the brake pads 68 coupled to the pistons 16 on face A of the actuator 10b face the braking surface 62 of the second brake disc 56.

The brake pads 68 coupled to the pistons 16 of the actuator 10c face the second braking surface 64 of the second brake disc 56. When brake fluid (not shown) within the cavities 14 which house the pistons 16 is pressurized, the pads 68 are pressed into contact with the braking surface 58 and 60 of brake disc 54 and surfaces 62 and 64 of brake disc 56.

The actuators 10a, 10b and 10c are mechanically coupled together for example by way of bolts (not shown). More significantly however the actuators 10a, 10b and 10c are in fluid communication with each other. This is achieved by placing the internal galleries 20a of actuator 10a in fluid communication with the galleries 20b of actuators 10b and in turn, the galleries 20b in fluid communication with the galleries 20c of actuator 10c. This can be achieved by coupling the outlet port 24 of actuator 10a with the inlet port 22 of actuator 10b and the outlet port 24 of actuator 10b with the inlet port 22 of actuator 10c. Hydraulic fluid is provided to the pistons 16 of actuators 10a, 10b and 10c through the inlet port 22 of actuator 10a. FIG. 4 further depicts brake fluid bleeding ports 25 and 27.

For simplicity, the inserts 30 are not depicted in FIG. 4. However, FIG. 4 further depicts the inclusion of heat shielding seals 70 which have been snap fitted to the ends of pistons 16 adjacent the corresponding pads 68. The seals 70 are preferably of the form described in Applicant's copending Patent Application No. PR 7395, the contents of which are incorporated herein by way of reference. Second seals in the form of O-rings 72 are further depicted which are seated within the actuators 10 (or more specifically within the inserts 30 not shown).

The system 50 depicted in FIG. 4 can be considered to be a modular multi piston multi disc brake system. The modularity being manifested by the ability to axially stack both actuators 10 and brake discs to the rotor 52. When multiple brake discs are provided a single brake actuator 10b having pistons on both faces A and B can be located between adjacent brake discs as exemplified by actuator 10b in FIG. 4. Alternatively, if desired, "single sided" actuators having pistons on one face only can be provided in a back to back configuration between adjacent discs. Fluid coupling between adjacent actuators 10 can be achieved by way of separate tubular conduits which connect the actuators 10 together or alternately by forming the actuators 10 with integral coupling conduits which extend laterally from the ports 22 and 24 for registration with corresponding ports 22 and 24 of adjacent actuators 10.

From the above description, it will be appreciated that the actuator 10 facilitates the application of multiple brake pads at different locations on to the same surface of a single disc and moreover that a single actuator 10 (e.g. actuator 10b) can apply brake pads to two axially spaced adjacent discs. The actuator 10 further facilitates the construction of a braking system provided with a plurality of spaced apart rotating discs fixed on an axle with respective actuators 10 disposed therebetween. Such a system differs from that described in the Background of the Invention in that the discs are not required to axially slide along the axle in order to effect a braking action.

Now that an embodiment of the present invention has been described in detail it will be apparent to those skilled in the relevant arts that numerous modifications and variations may be made without departing from the basic inventive concepts. For example, in FIGS. 1–3, the housing 12 is depicted as being provided with six cavities 14, with three on each of faces A and B, and with circumferentially adjacent cavities 14 being staggered. However, the actuator 10 can be made with all of the cavities opening on to one of faces A or B. Alternately, the actuator 10 can be provided with pairs of cavities partially or fully overlapping axially on opposite faces A and B. Further, the actuator 10 can be formed of any number of cavities on either face A or B.

In a further modification, the galleries 20 can be arranged in sets to provide fluid communication to selected pistons 16. Thus, for example, the galleries 20 may be arranged so as to communicate fluid pressure from a common master cylinder (not shown) to both pistons 16 in the cavities 14A in the 10 and 2 o'clock positions with reference to FIG. 1 so as to act as service brakes, with another set of galleries providing separate fluid communication between another master cylinder (or other type of fluid pressure source) and the pistons in the cavity 14 at the 6 o'clock position which may then be used as a park or emergency brake. Further, it is possible, if desired, to arrange the galleries 20 and the inserts 30 so that the individual pistons 16 within a particular cavity 14 are separately subjected to fluid pressure.

All such modifications and variations together with others that would be obvious to a person of ordinary skill in the relevant arts are deemed to be within the scope of the present invention the nature of which is to be determined from the above description, and the appended claims.

The invention claimed is:

1. A brake actuator comprising:
   an annular housing having first and second opposite radial faces;
   a plurality of cavities formed in and about said housing, at least one of said cavities opening onto said first radial face, and at least one of said cavities opening onto said second radial face, said annular housing being in the form of an annulus;
   wherein circumferentially adjacent cavities open onto opposite ones of said first and second faces; and,
   one or more pistons disposed in each of said cavities, each of said pistons moveable under influence of fluid pressure within a respective cavity to a braking position where said piston extends axially away from said respective cavity.

2. The brake actuator according to claim 1 wherein said housing is provided with a plurality of internal galleries providing fluid communication between a supply of actuating fluid and one or more of said cavities.

3. The brake actuator according to claim 2 wherein said galleries are arranged in one or more sets, each set providing fluid communication to at least one piston in two or more separate cavities.

4. The brake actuator according to claim 1 wherein said cavities are evenly spaced about said housing.

5. The brake actuator according to claim 1 wherein said brake actuator includes a plurality of piston inserts, each insert demountably retained within a respective cavity, wherein each insert defines at least one cylinder for housing a corresponding piston.

6. The brake actuator according to claim 5 wherein when each insert defines more than one cylinder, said insert is further provided with a passageway providing fluid communication between said cylinders.

7. The brake actuator according to claim 5 wherein when said insert defines more than one cylinder, said cylinders are fluidly isolated from each other.

8. The brake actuator according to claim 1 wherein said housing is further provided with a recess in axial alignment with each of said cavities for receiving a brake pad.

9. A brake actuator comprising:
   an annular housing having first and second opposite radial faces;
   a plurality of cavities formed in and about said housing, at least one of the cavities opening onto the first radial face and at least one of the cavities opening onto the second radial face wherein at least two of said cavities are relatively located to at least partially overlie each other and open onto respective opposite ones of said first and second radial faces; and,
   one or more pistons disposed in each of said cavities, each of said pistons moveable under influence of fluid pressure within a respective cavity to a braking position where said piston extends axially away from said respective cavity.

10. A brake actuator comprising:
    an annular housing having first and second opposite radial faces;
    a plurality of cavities formed in and about said housing, at least one of the cavities opening onto the first radial face and at least one of the cavities opening onto the second radial face;
    wherein said at least one cavity that opens onto said first radial face is disposed radially closer to an internal radius of said annular housing than said at least one cavity that opens onto said second radial face; and,
    one or more pistons disposed in each of said cavities, each of said pistons moveable under influence of fluid pressure within a respective cavity to a braking position where said piston extends axially away from said respective cavity.

11. A multi pad brake system including at least:
    a rotor having a first radially extending brake disc, said brake disc having a first radial braking surface and a second opposite radial braking surface;
    first and second brake actuators, each actuator comprising:
    an annular housing having first and second opposite radial faces;
    a plurality of cavities formed in and about said housing, each of said cavities opening onto one of said first or second radial faces;
    one or more pistons disposed in each of said cavities, each of said pistons moveable under influence of fluid pressure within a respective cavity to a braking position where said piston extends axially away from said respective cavity; and,
    a plurality of brake pads, said brake pads associated with the pistons of said first and second brake actuators; said first brake actuator juxtaposed relative to said first brake disc so that the brake pads associated with the pistons of the first brake actuator face said first braking surface; said second brake actuator juxtaposed relative to said first brake disc so that the brake pads associated with the pistons of the second brake actuator face said second braking surface;
    whereby, under influence of fluid pressure in the cavities containing the pistons with which said brake pads are associated, said brake pads are forced into contact with said first and second braking surfaces.

12. The multi-pad brake system according to claim 11 wherein said first and second brake actuators are in fluid communication with each other.

13. The multi-pad brake system according to claim 11 wherein said rotor includes a second radially extending brake disc having respective opposite first and second radial braking surfaces, said first and second brake discs axially spaced apart with said second brake actuator disposed therebetween; and wherein said second brake actuator includes at least one piston on the first radial face of the housing of the second brake actuator which faces the first braking surface of the second brake disc and, at least one piston on the second radial face of the housing of the second brake actuator which faces the second braking surface of the first disc whereby, upon influence of fluid pressure within the cavities of said second brake actuator, the brake pads associated with the pistons of the second brake actuator are pressed into contact with said second braking surface of said first disc and said first braking surface of said second disc.

14. The multi-pad brake system according to claim 13 wherein the pistons on the first radial face of the housing of the second brake actuator are radially offset from the pistons on the second radial face of the housing of the second brake actuator.

15. The multi-pad brake system according to claim 13 including a third brake actuator, and brake pads associated with the pistons of the third brake actuator; said third brake actuator juxtaposed relative to said second brake disc so that the brake pads coupled to the pistons of the third brake actuator face said second braking surface of said second disc.

16. The multi-pad brake system according to claim 15 wherein said third brake actuator is in fluid communication with said first and second brake actuators.

17. A method of constructing a multi-pad multi-disc brake system including the steps of:
provides a plurality of brake actuators, each brake actuator comprising:
an annular housing having first and second opposite radial faces;
a plurality of cavities formed in and about said housing, each of said cavities opening onto one of said first or second radial faces;
one or more pistons disposed in each of said cavities, each of said pistons moveable under influence of fluid pressure within a respective cavity to a braking position where said piston extends axially away from said respective cavity;
providing a rotor having a plurality of brake discs, mutually adjacent brake discs being axially aligned with each other and axially spaced a fixed distance apart, each brake disc having opposite first and second radial braking surfaces;
disposing said brake actuators about said rotor so that pistons of said brake actuators face one of the braking surfaces of each brake disc;
associating a brake pad with the pistons in each cavity of said brake actuators;
relatively juxtaposing said brake actuators and brake discs so that under the influence of fluid pressure applied to said cavities said pistons can force said associated brake pads into contact with said one of said braking surfaces.

18. The method of claim 17 wherein said method includes providing fluid communication between at least two of said actuators whereby fluid pressure exerted on actuating fluid in one of said actuators can be communicated via that one actuator to a second actuator.

19. A brake actuator comprising:
an annular housing having first and second opposite radial faces;
a plurality of blind cavities formed in and about said housing, at least one of the cavities opening onto the first radial face and at least one of the cavities opening onto the second radial face; and
one or more pistons disposed in each of said cavities, each of said pistons moveable under influence of fluid pressure within a respective cavity to a braking position where said piston extends axially away from said respective cavity.

20. The brake actuator according to claim 19 wherein said housing is provided with a plurality of internal galleries providing fluid communication between a supply of actuating fluid and one or more of said cavities.

21. The brake actuator according to claim 20 wherein said galleries are arranged in one or more sets, each set providing fluid communication to at least one piston in two or more separate cavities.

22. The brake actuator according to claim 19 wherein circumferentially adjacent cavities open onto opposite ones of said first and second radial faces.

23. The brake actuator according to claim 19 wherein at least two of said cavities are relatively located to at least partially overlie each other and open onto respective opposite ones of said first and second radial faces.

24. The brake actuator according to claim 19 wherein the at least one cavity that opens onto one of the first or second radial faces are disposed radially closer to the internal radius of the annual housing than the at least one cavity that opens onto the other of the second or first radial faces.

25. A brake actuator comprising:
a single piece annular housing having first and second opposite radial faces, a continuous inner circumferential surface between the first and second radial faces and a continuous outer circumferential surface between the first and second radial faces, the inner circumferential surface defining a hole extending through a center of the housing and opening onto both the first and second radial faces;
a plurality of cavities formed in and about said housing, at least one of the cavities opening onto the first radial face and at least one of the cavities opening onto the second radial face; and,
one or more pistons disposed in each of said cavities, each of said pistons moveable under influence of fluid pressure within a respective cavity to a braking position where said piston extends axially away from said respective cavity.

26. The brake actuator according to claim 25 wherein said housing is provided with a plurality of internal galleries providing fluid communication between a supply of actuating fluid and one or more of said cavities.

27. The brake actuator according to claim 26 wherein said galleries are arranged in one or more sets, each set providing fluid communication to at least one piston in two or more separate cavities.

28. The brake actuator according to claim 25 wherein circumferentially adjacent cavities open onto opposite ones of said first and second faces.

29. The brake actuator according to claim 25 wherein at least two of said cavities are relatively located to at least partially overlie each other and open onto respective opposite ones of said first and second radial faces.

30. The brake actuator according to claim 25 wherein the at least one cavity that opens onto one of the first or second radial faces are disposed radially closer to the internal radius of the annular housing than the at least one cavity that opens onto the other of the second or first radial faces.

31. A brake actuator comprising:
a stator, the stator being formed as an annular housing having first and second opposite radial faces;
a plurality of cavities formed in and about said housing, at least one of the cavities opening onto the first radial face and at least one of the cavities opening onto the second radial face; and
one or more pistons disposed in each of said cavities, each of said pistons moveable under influence of fluid pressure within a respective cavity to a braking position where said piston extends axially away from said respective cavity.

32. The brake actuator according to claim 31 wherein said housing is provided with a plurality of internal galleries providing fluid communication between a supply of actuating fluid and one or more of said cavities.

33. The brake actuator according to claim 32 wherein said galleries are arranged in one or more sets, each set providing fluid communication to at least one piston in two or more separate cavities.

34. The brake actuator according to claim 33 wherein circumferentially adjacent cavities open onto opposite ones of said first and second faces.

35. The brake actuator according to claim 34 wherein at least two of said cavities are relatively located to at least partially overlie each other and open onto respective opposite ones of said first and second radial faces.

36. The brake actuator according to claim 31 wherein the at least one cavity that opens onto one of the first or second radial faces are disposed radially closer to the internal radius of the annular housing than the at least one cavity that opens onto the other of the second or first radial faces.

* * * * *